(12) United States Patent
Chae

(10) Patent No.: US 7,073,003 B2
(45) Date of Patent: Jul. 4, 2006

(54) PROGRAMMABLE FIXED PRIORITY AND ROUND ROBIN ARBITER FOR PROVIDING HIGH-SPEED ARBITRATION AND BUS CONTROL METHOD THEREIN

(75) Inventor: Kwan-yeob Chae, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 234 days.

(21) Appl. No.: 10/720,808

(22) Filed: Nov. 24, 2003

(65) Prior Publication Data

US 2004/0133724 A1    Jul. 8, 2004

(30) Foreign Application Priority Data

Nov. 27, 2002  (KR)  ............. 10-2002-0074376

(51) Int. Cl.
*G06F 13/36* (2006.01)
(52) U.S. Cl. ............... 710/111; 710/113; 710/116
(58) Field of Classification Search ......... 710/111, 710/113, 116
See application file for complete search history.

(56) References Cited

U.S. PATENT DOCUMENTS

| 5,546,548 A | * | 8/1996 | Chen et al. ............ 710/116 |
| 5,583,999 A | * | 12/1996 | Sato et al. ............ 710/100 |
| 5,623,672 A | * | 4/1997 | Popat ............ 710/240 |
| 5,898,694 A | * | 4/1999 | Ilyadis et al. ............ 370/462 |
| 6,006,303 A | * | 12/1999 | Barnaby et al. ............ 710/244 |
| 6,073,132 A | * | 6/2000 | Gehman ............ 707/9 |
| 6,092,137 A | * | 7/2000 | Huang et al. ............ 710/111 |

OTHER PUBLICATIONS

Stanley Lippman, "C++ Primer", 1991, 2nd Ed., pp. 25-29.*

\* cited by examiner

*Primary Examiner*—John R. Cottingham
*Assistant Examiner*—Justin King
(74) *Attorney, Agent, or Firm*—Mills & Onello LLP

(57) ABSTRACT

In a programmable fixed priority and round-robin arbiter and a bus control method of the same, the arbiter includes, an HPRIF rotating unit, a request-reordering unit, a request-selecting unit, and a grant-reordering unit. In the fixed priority mode or the round-robin mode, the HPRIF rotating unit rotates priority information related to bus masters stored in a predetermined register in a predetermined direction to give the highest priority to a bus master in response to pointer information and outputs changed priority information. When a request signal is received from the bus masters, the request-reordering unit reorders requested priorities of the bus masters to be in accordance with the changed priority information and outputs a request-reordering signal. The request-selecting unit outputs a bus master-selecting signal according to priorities in response to the request-reordering signal. The grant-reordering unit outputs a bus master grant signal to the bus masters according to priorities in response to the bus master-selecting signal.

8 Claims, 9 Drawing Sheets

FIG. 8
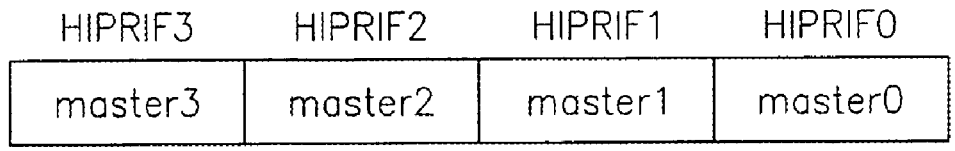
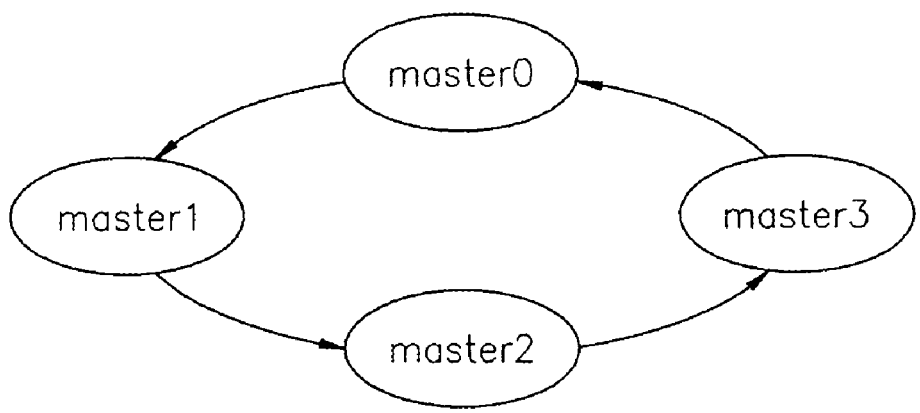
FIG. 9
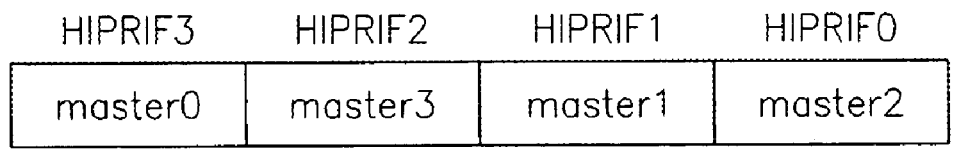
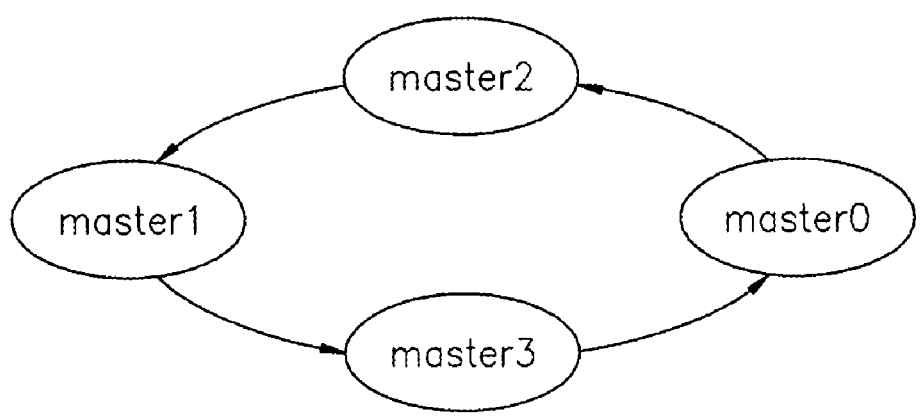

US 7,073,003 B2

PROGRAMMABLE FIXED PRIORITY AND ROUND ROBIN ARBITER FOR PROVIDING HIGH-SPEED ARBITRATION AND BUS CONTROL METHOD THEREIN

BACKGROUND OF THE INVENTION

This application claims priority from Korean Patent Application No. 2002-74376, filed on 27 Nov. 2002, in the Korean Intellectual Property Office, the disclosure of which is incorporated herein in its entirety by reference.

1. Field of the Invention

The present invention relates to an arbiter and a method of controlling the same, and more particularly, to a programmable fixed priority and a round robin arbiter and a method of controlling a bus therein.

2. Description of the Related Art

As the speed of a system clock increases with the development of high-speed and high-performance system-on-a-chip (SOC) circuits, the speed or performance of an arbitrator, which arbitrates bus occupations of master blocks in a bus system, has improved.

In general, the arbiter performs bus arbitration for master function blocks connected to a bus. Bus arbitration is an operation under which, when any master block transmits a request signal including information related to a request for use of the bus, to the arbiter, the arbiter receives the request signal from the master block or blocks and outputs a bus master grant signal including information related to a grant for use of the bus, in a predetermined order. In this manner, each of the master blocks can transmit data over the bus.

Conventional arbiters can support both a programmable fixed priority mode and a round robin mode, the mode being user selectable.

In the fixed priority mode, after each master block transmits the request signal to the arbiter, the arbiter, which has been previously programmed to assign different priorities to the master blocks, outputs the bus master grant signal to a master block having the highest priority.

In the round robin mode, the arbiter equally assigns priority to each of the master blocks according to pointer information. That is, in the round robin mode, the arbiter assigns the lowest priority to the master block that has the highest priority and receives the bus master grant signal, and then, assigns the highest priority to a master block whose priority is lower than the master block that receives the bus master grant signal.

FIG. 1 is a block diagram of a conventional arbiter.

Referring to FIG. 1, the conventional arbiter includes a request-reordering logic 110, a first multiplexer (MUX) 120, a request-selecting logic 130, a grant-reordering logic 140, a second multiplexer (MUX) 150, a request-rotating logic 160, and a grant-rotating logic 170.

The request-reordering logic 110 reorders requested priorities of the master blocks and outputs a request-reordering signal so that the priorities can be in accordance with priority information of the master blocks stored in a programmable priority register, referred to herein as an "HPRIF" register. Here, the priorities of the master blocks can be programmed into the HPRIF register.

Here, the priorities of the master blocks can be programmed into the HPRIF register.

The first multiplexer (MUX) 120 selectively outputs the request-reordering signal in the programmable fixed priority mode or the round robin mode.

The request-selecting logic 130 outputs a bus master-selecting signal according to the priorities in response to input request-reordering signals.

The grant-reordering logic 140 outputs a bus master grant signal according to the priorities in response to the bus master-selecting signal.

The second multiplexer (MUX) 150 selectively outputs a bus master grant signal in the programmable fixed priority mode or the round robin mode.

The request-rotating logic 160 rotates requested priorities in a direction based on pointer information indicating which master block currently has the highest priority, reorders the requested priorities, and outputs the request-reordering signal. That is, the request-rotating logic 160 used in the round robin mode does not reorder the priorities based on priority information stored in the HPRIF register but rather reorders the priorities based on the pointer information. Therefore, it is not possible for the arbiter to give priority to a master block for occupation of a bus not used by other master blocks.

The grant-rotating logic 170 rotates a grant priority in a direction based on the bus master-selecting signal and outputs a bus master grant signal according to the priorities.

FIG. 2 is a flowchart illustrating the operation of the conventional arbiter of FIG. 1 operating in a fixed priority mode.

Referring to FIG. 2, when the conventional arbiter is set to the fixed priority mode, the first multiplexer (MUX) 120 and the second multiplexer (MUX) 150 are also set to the fixed priority mode. In addition, fields HPRIF0, HPRIF1, HPRIF2, and HPRIF3 of a HPRIF register which stores priorities of the master blocks (master 3, master 0, master 2, and master 1) are sequentially stored (step S210). Here, HPRIF0 stores priority information on a master block having the highest priority and HPRIF3 stores priority information on a master block having the lowest priority. In this example, the master block having the highest priority is fixed as master 3.

Since the request-reordering logic 110 has to reorder the requested priorities of the master blocks according to priority information stored in the HPRIF register when a delayed request signal is input from a master block, the request-reordering logic 110 outputs the request-reordering signal to give the highest priority to the master block if the request signal is input from master 3 and give a lower priority to the master block if the request signal is input from one of the other master blocks (step S220). Then, the request-selecting logic 130 outputs the bus master-selecting signal according to the priorities such that weight is given to master 3 in response to the request-reordering signal (step S230). The grant-reordering logic 140 outputs the bus master grant signal according to the priorities such that weight is given to master 3 in response to the bus master-selecting signal (step S240). Thus, the master block receiving the bus master grant signal can occupy the bus.

FIG. 3 is a flowchart showing the conventional arbiter of FIG. 1 operating in the round robin mode. FIG. 4 is a view for explaining operations of the conventional arbiter of FIG. 1 in the round robin mode in more detail.

Referring to FIGS. 3 and 4, when the conventional arbiter is set to the round robin mode, the first multiplexer (MUX) 120 and the second multiplexer (MUX) 150 are set to the round robin mode, and a predetermined pointer points to '1' (step S310), which means that the highest priority is given to master 1.

Here, if the delayed request signal is input from the master block, the request-rotating logic 160, in response to the pointer pointing master 1 that currently has the highest priority, rotates the requested priorities in the direction shown in FIG. 4 and reorders the requested priorities of the master blocks. Therefore, the request-rotating logic 160 outputs the request-reordering signal such that the request-rotating logic 160 gives the highest priority to the master block if the request signal is input from master 1 and gives a lower priority to the master block if the request signal is input from one of the other masters (step S320). The request-selecting logic 130 outputs the bus master-selecting signal according to the priorities such that the request-selecting logic 130 gives the highest priority to master 1 in response to the request-reordering signal (step S330). The grant-rotating logic 170 outputs the bus master grant signal according to the priorities in response to the bus master-selecting signal such that it rotates the grant priorities in the direction shown in FIG. 4 and gives the highest priority to master 1 (step S340). Thus, the master block receiving the bus master grant signal can occupy the bus. Here, if the bus master grant signal is output to a master block, the lowest priority is given to the master that had the highest priority, and the pointer increases by 1. Thus, the highest priority is given to master blocks in an order shown in FIG. 4. Therefore, the master blocks each have an opportunity of being assigned the highest priority.

In the conventional arbiter, the request-selecting logic 130 can be used in both the fixed priority mode and the round robin mode. However, the request-reordering logic 110 and the grant-reordering logic 140 used in the fixed priority mode are different from the request-rotating logic 160 and the grant-rotating logic 170 used in the round robin mode. Therefore, in the conventional arbiter, additional first and second multiplexers 120 and 150 are needed to select the fixed priority mode or the round robin mode as shown in FIG. 1. Thus, the circuit becomes more complicated and processing speed goes down.

Since some signals are applied to the request-reordering logic 110 and the grant-reordering logic 140 in the fixed priority mode and to the request-rotating logic 160 and the grant-rotating logic 170 in the round robin mode regardless of the operation mode of the arbiter, a circuit operating in another mode consumes power even when the arbiter operates in a certain mode. In particular, the fixed priority mode consumes a lot of power because the request-rotating logic 160 and the grant-rotating logic 170 are operated unnecessarily.

In addition, when the request signal input from the master block drives both the request-reordering logic 110 and the request-rotating logic 160, loads increase and the processing speed becomes slow due to the delayed signal. When the bus master-selecting signal output from the request-selecting logic 130 drives both the grant-reordering logic 140 and the grant-rotating logic 170, loads increase and the processing speed becomes slow due to the delayed signal.

Since the conventional arbiter rotates the requested priority and the grant priority according to a predetermined order in the round robin mode, it is not possible to give the priority to a master for occupation opportunity of the bus not used by other master blocks.

SUMMARY OF THE INVENTION

The present invention provides an arbiter which supports both a fixed priority mode and a round robin mode, rotates information on a HPRIF register in which priority information of masters are stored to enable the resulting circuit to be more simpler in design and have decreased power consumption and improved processing speed, and assigns priority to a master for occupation opportunity of a bus that is not used in the round robin mode.

The present invention also provides a bus control method of an arbiter which supports both a fixed priority mode and a round robin mode, rotates information on a HPRIF register in which priority information of masters are stored to enable a circuit to be simpler and have decreased power consumption and improved processing speed, and assigns priority to a master for occupation opportunity of a bus that is not used in the round robin mode.

According to an aspect of the present invention, there is provided a programmable fixed priority and round-robin arbiter in an arbiter operating in a fixed priority mode or a round-robin mode. The programmable fixed priority and round-robin arbiter includes a rotating unit, for example an HPRIF rotating logic unit, a request-reordering unit, a request-selecting unit, and a grant-reordering unit. The rotating unit, when operating in the fixed priority mode or the round-robin mode, rotates priority information related to bus masters stored in a register in a direction to give the highest priority to a bus master corresponding to pointer information and outputs changed priority information. The request-reordering unit, when a request signal is received from the bus masters, reorders requested priorities of the bus masters to be in accordance with the changed priority information and outputs a request-reordering signal. The request-selecting unit outputs a bus master-selecting signal according to priorities in response to the request-reordering signal. The grant-reordering unit outputs a bus master grant signal to the bus masters according to priorities in response to the bus master-selecting signal.

Here, in the round-robin mode, the priority information is programmed such that weight is given to at least one of the bus masters.

The pointer information does not change in the fixed priority mode and periodically changes in the round-robin mode, for example at the time period when the bus master grant signal of the highest priority is output.

According to another aspect of the present invention, there is provided a bus control method in which an arbiter operating in a fixed priority mode or a round-robin mode controls a plurality of bus masters. The arbiter rotates priority information related bus masters stored in a register to give the highest priority to a bus master corresponding to pointer information in the fixed priority mode or the round-robin mode and outputs changed priority information. At least one of the bus masters transmits a request signal for occupation of a bus to the arbiter. The arbiter reorders requested priorities of the bus masters corresponding to the changed priority information and outputs a request-reordering signal. The arbiter outputs a bus master-selecting signal according to priorities in response to the request-reordering signal. The arbiter outputs a bus master grant signal to the bus masters in response to the bus master-selecting signal according to priorities.

In the round-robin mode, the priority information is programmed such that weight is given to at least one of the bus masters.

The pointer information does not change in the fixed priority mode and changes having a predetermined period in the round-robin mode, for example, at the time period of when the bus master grant signal of the highest priority is output.

BRIEF DESCRIPTION OF THE DRAWINGS

The above and other features and advantages of the present invention will become more apparent by describing in detail exemplary embodiments thereof with reference to the attached drawings in which:

FIG. 8 is a conceptual view for explaining the operation of a round-robin mode of the programmable fixed priority and round-robin arbiter according to the present invention;

FIG. 9 is a conceptual view for explaining the operation of the programmable round-robin mode of the programmable fixed priority and round-robin arbiter according to the present invention.

DETAILED DESCRIPTION OF PERFERRED EMBODIMENTS

Figure 1:
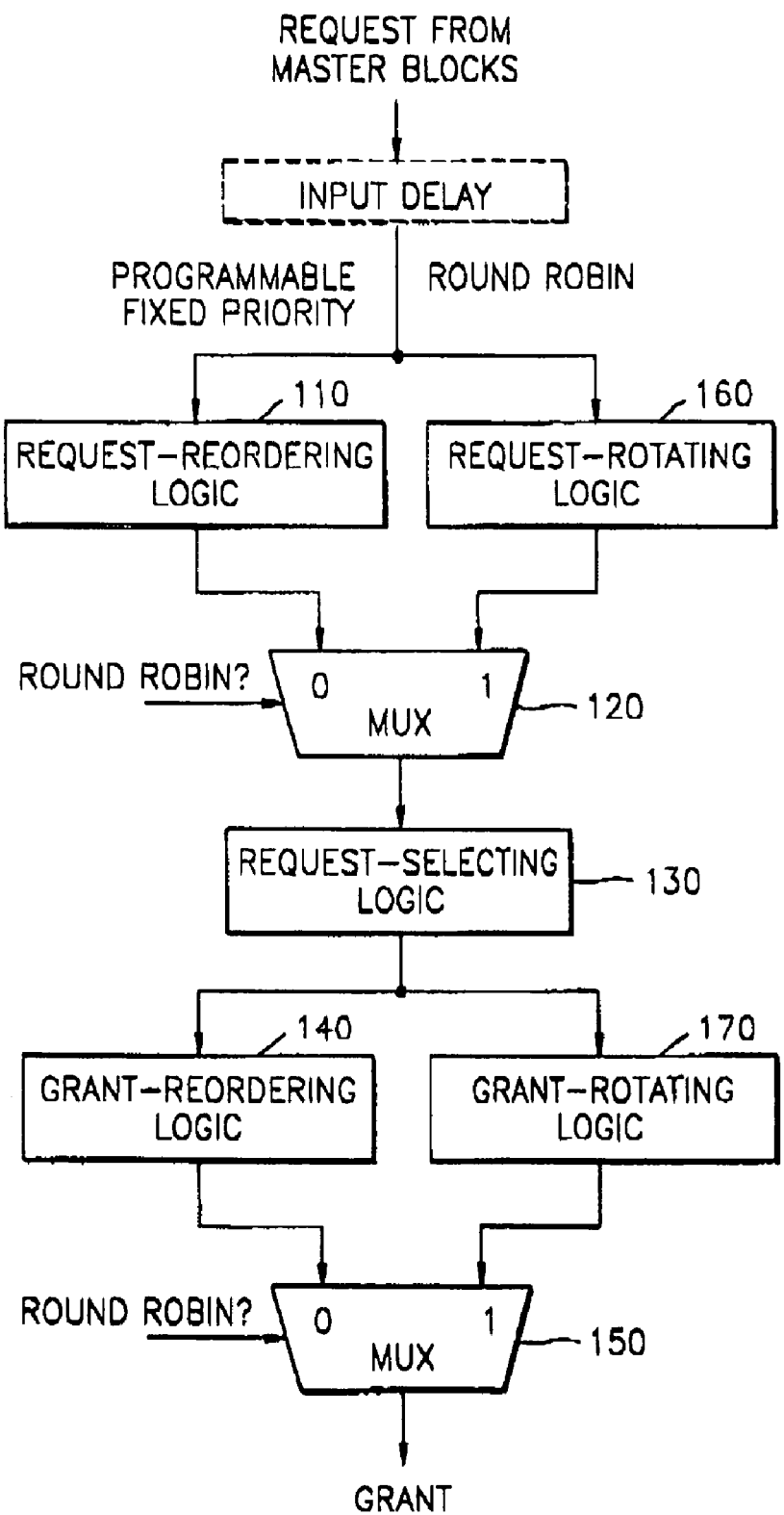
FIG. 1 is a block diagram of a conventional arbiter.
Figure 2:
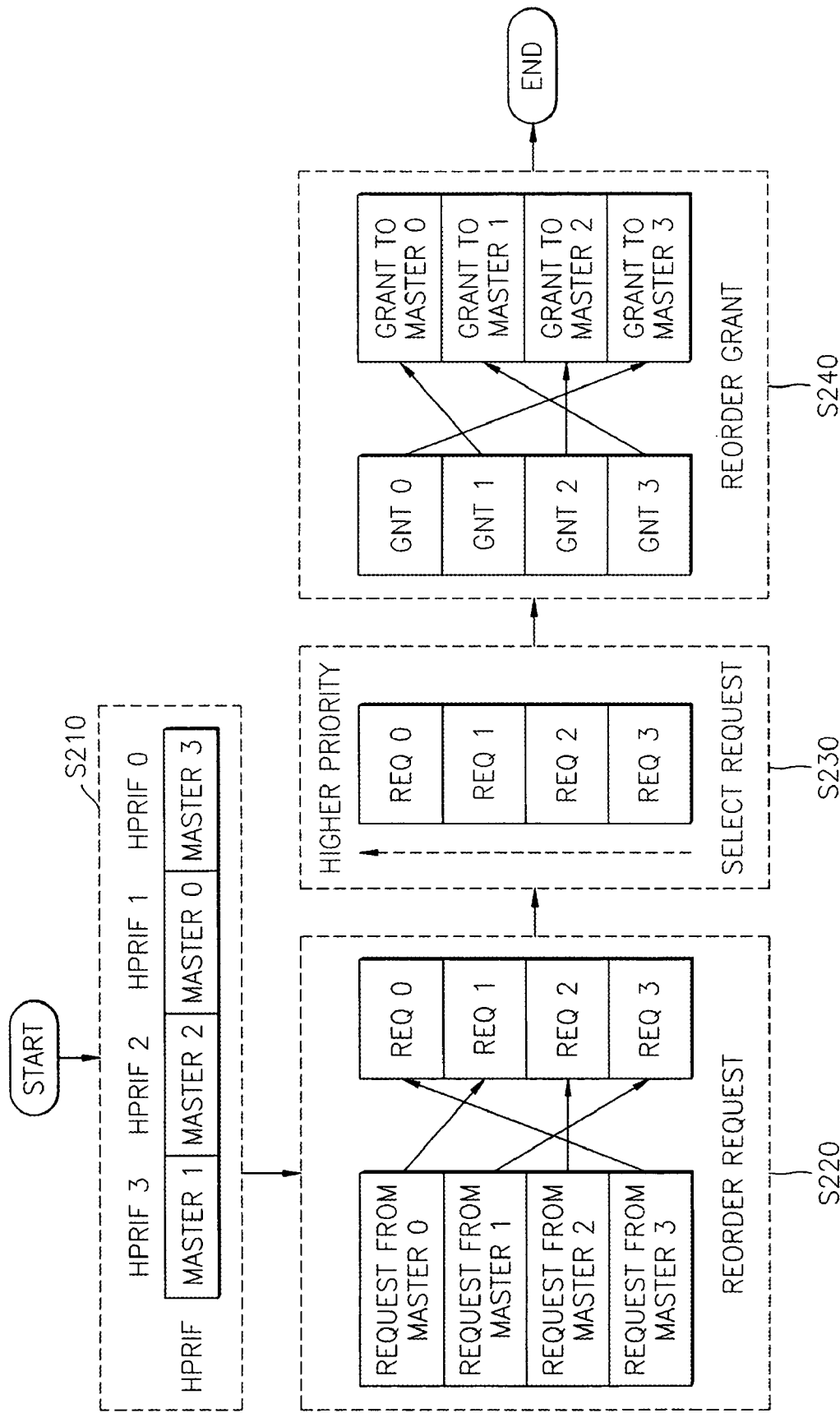
FIG. 2 is a flowchart illustrating operation of the conventional arbiter of FIG. 1 operating in a fixed priority mode.
Figure 3:
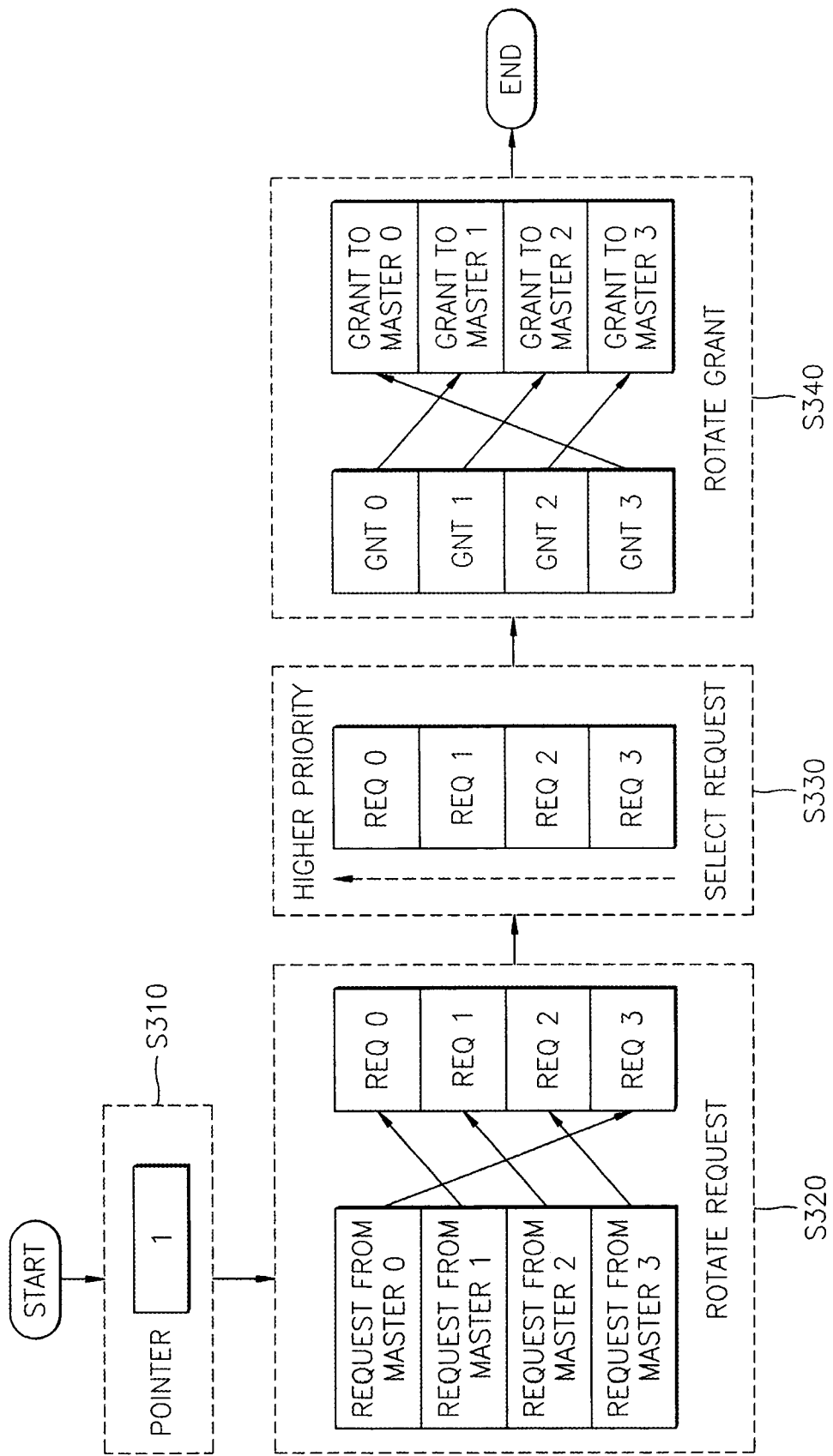
FIG. 3 is a flowchart illustrating operation of the conventional arbiter of FIG. 1 operating in a round-robin mode.
Figure 4:
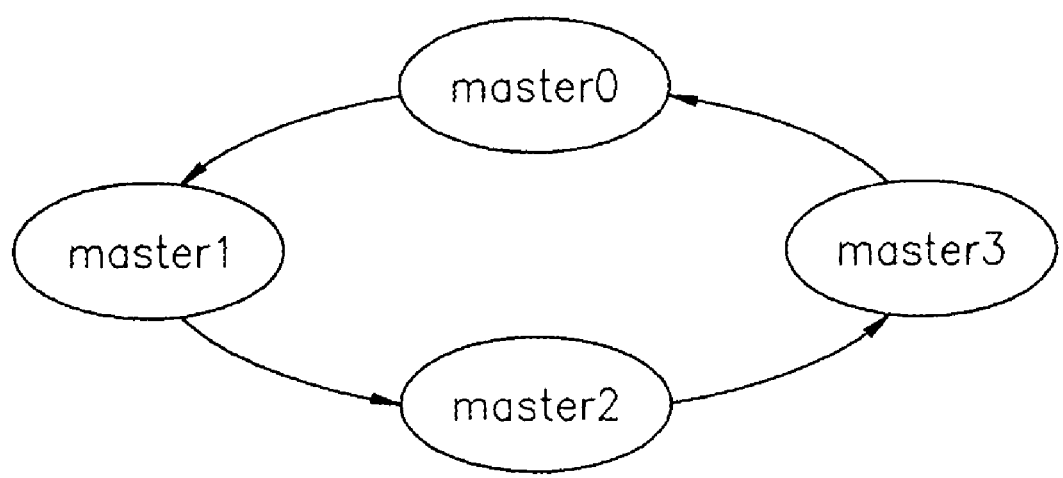
FIG. 4 is a conceptual view for explaining the operation of the conventional arbiter of FIG. 1 in a round-robin mode.

The present invention now will be described more fully with reference to the accompanying drawings, in which preferred embodiments of the invention are shown. In the drawings, like reference numerals are used to refer to like elements throughout.

Figure 5:
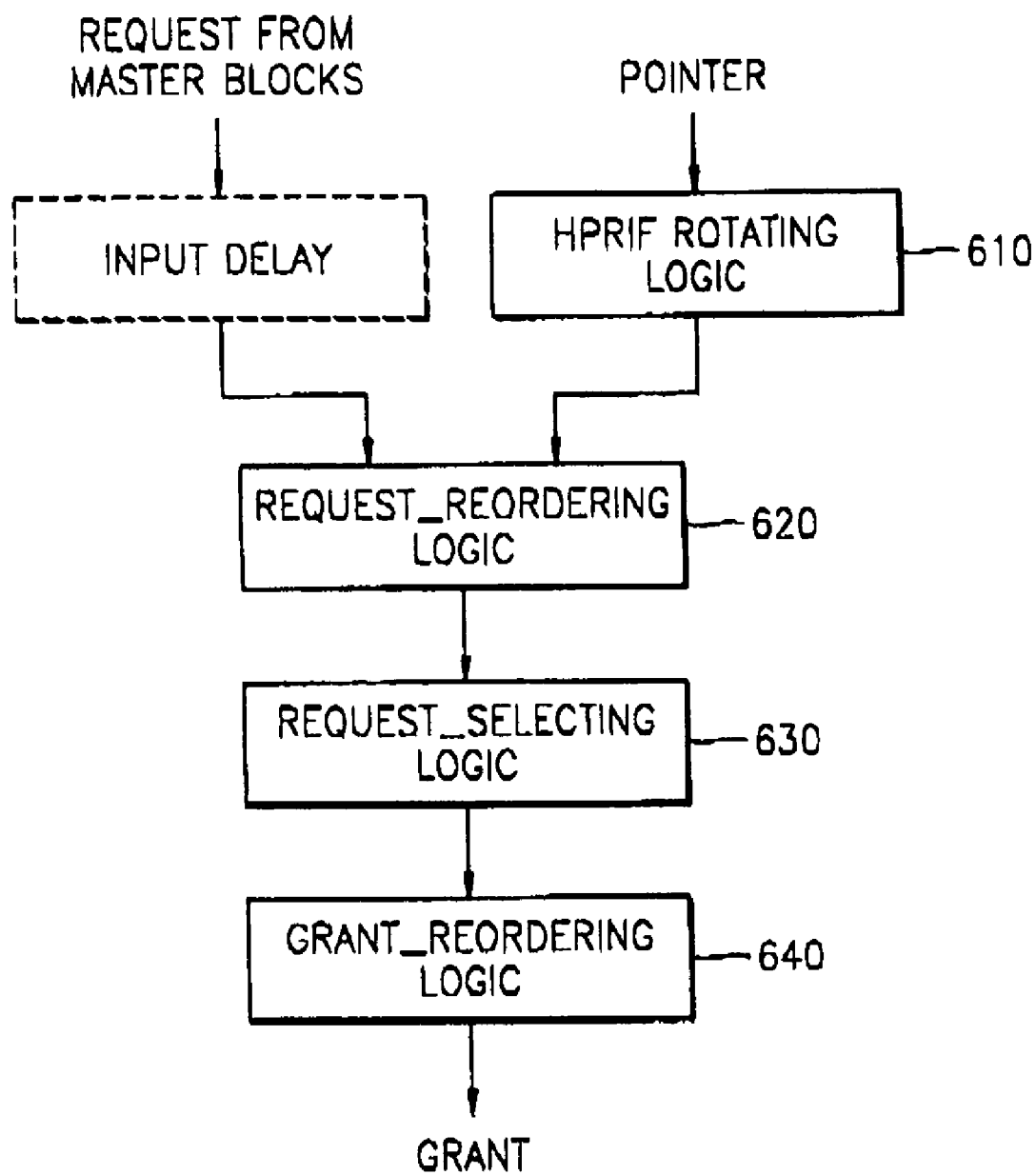
FIG. 5 is a block diagram of a programmable fixed priority and round-robin arbiter according to the present invention.

FIG. 5 is a block diagram of a programmable fixed priority and round-robin arbiter according to the present invention.

Referring to FIG. 5, a programmable fixed priority and round-robin arbiter according to the present invention includes an HPRIF rotating logic 610, a request-reordering logic 620, a request-selecting logic 630, and a grant-reordering logic 640.

The HPRIF rotating logic 610 outputs information including reordered priority information by rotating priority information of bus masters stored in the HPRIF register to give the highest priority to a bus master that the pointer information points to, in response to changes in pointer information in the fixed priority mode or the round-robin mode. Here, the HPRIF register is included in the HPRIF rotating logic 610, and priority information of the bus masters can be programmed into the HPRIF register.

The pointer information does not change in the fixed priority mode but periodically changes in the round-robin mode, particularly when a grant signal of a bus master having the highest priority is output. In addition, the priority information can be programmed such that the weight is given to a specific bus master.

When request signals are input from the bus masters, the request-reordering logic 620 reorders the requested priority of bus masters to be in accordance with the information including reordered priority information and outputs a request-reordering signal.

The request-selecting logic 630 outputs a bus master-selecting signal according to priorities in response to the request-reordering signal.

The grant-reordering logic 640 outputs bus master grant signals to bus masters according to priorities in response to the bus master-selecting signal.

Hereinafter, operations of the programmable fixed priority and round robin arbiter according to the present invention will be described in more detail.

Figure 6:
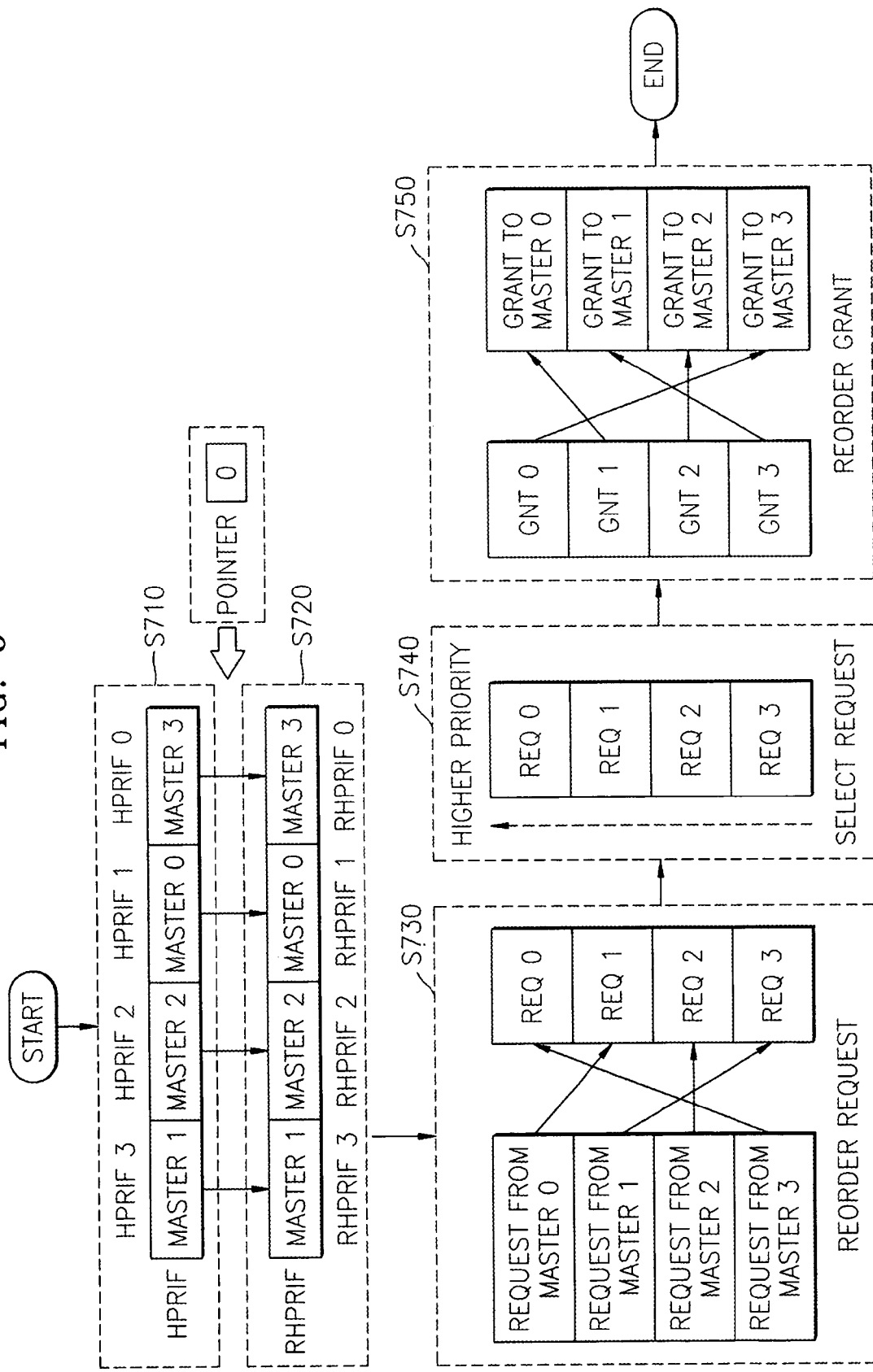
FIG. 6 is a flowchart illustrating operation of the programmable fixed priority and round-robin arbiter according to the present invention, operating in a fixed priority mode.

FIG. 6 is a flowchart that illustrated the operation of a programmable fixed priority and round-robin arbiter according to the present invention, operating in a fixed priority mode.

Referring to FIG. 6, the programmable fixed priority and round-robin arbiter according to the present invention rotates priority information of bus masters stored in the HPRIF register to give priority to a bus master corresponding to the pointer information and outputs information including reordered priority information (steps S710 and S720). Here, the priority information is reordered by decoding a multiplexer in response to changes in the pointer information, and such reordering does not cause a decrease in a processing speed due to a clock delay.

The pointer information is an external signal that periodically changes in the round robin mode, and is fixed as "0" in the fixed priority mode. For example, for 2-bit data, the pointer information fixed as "0" corresponds to "00", pointer information fixed as "1" corresponds to "01", fixed as "2" corresponds to "10", and fixed as "3" corresponds to "11".

Here, since the pointer information does not change while operating in the fixed priority mode, the HPRIF rotating logic 610 maintains the priority information of the bus master stored in the fields HPRIF0 through HPRIF3 without rotating the priority information (step S720). That is, since the pointer information is fixed as "0" and the bus master stored in the field HPRIF0 has the highest priority, the priority information of the bus masters is maintained without rotating the priority information (step S720). Here, it is assumed that the priorities are stored in the fields HPRIF0 through HPRIF3 corresponding to master 3, master 0, master 2, and master 1 (step S710).

That is, as shown in FIG. 6, the priority information output from the HPRIF rotating logic 610 is identical to the priority information of bus masters after the priority information of the bus master (HPRIF information) stored in each field of the HPRIF register is rotated (steps S710–S720).

The request-reordering logic 620, the request-selecting logic 630, and the grant-reordering logic 640 operate according to the priority information after the priority information rotation (RHPRIF information) (S730–S750).

Here, if the request-reordering logic 620 receives request signals from the bus masters, the request-reordering logic 620 reorders requested priorities of the bus masters according to the RHPRIF information in which master 3 has the highest priority (step S730). The request-selecting logic 630 outputs the bus master-selecting signal according to priorities in response to the request-reordering signal such that master 3 has the highest priority (step S740). The grant-reordering logic 640 outputs the bus master grant signal according to priorities in response to the bus master-selecting signal such that master 3 receives the bus master grant signal (step S750).

Figure 7:
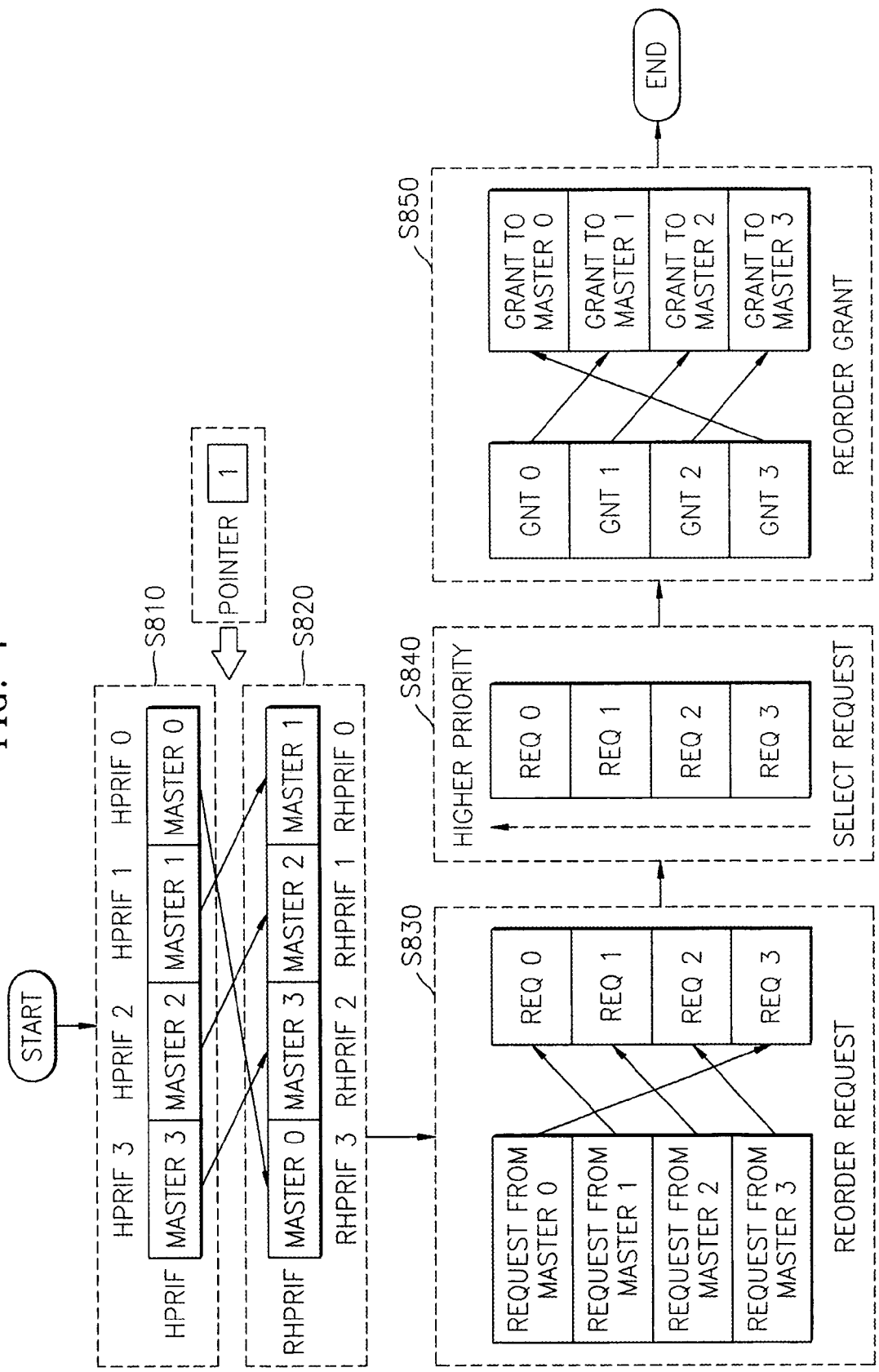
FIG. 7 is a flowchart illustrating operation of the programmable fixed priority and round-robin arbiter according to the present invention, operating in a round-robin mode.

FIG. 7 is a flowchart illustrating the operation of a programmable fixed priority and round-robin arbiter according to the present invention, operating in a round-robin mode where a HPRIF rotating logic 610 rotates priority information of bus masters stored in the HPRIF register (step S810) to give priority to a bus master corresponding to changeable pointer information and outputs reordered priority information (step S820). Here, reordering of priority information denotes controlling the multiplexer or the like to be in accordance with pointer information that is changed. Thus, in this example, system speed is not decreased due to delay of the clock period.

The pointer information is an external signal that periodically changes in the round robin mode, in particular, when the grant-reordering logic 640 outputs the bus master grant signal of the highest priority. In addition, the priority information can be programmed in such a way that weight is given to a specific bus master. For example, in the round-robin mode, the changeable pointer information "0", "1", "2" and "3" points to a bus master having the highest priority stored in the fields HPRIF0, HPRIF1, HPRIF2, and HPRIF3.

In FIG. 7, it is assumed that the pointer information is "1" and master 1 stored in the HPRIF1 has the highest priority (steps S810–820). While operating in the round-robin mode, as the pointer information changes, the HPRIF rotating logic 610 rotates priority information of the bus masters master 0 through master 3 stored in the fields HPRIF0 through HPRIF3 (step S810) and outputs priority information of the bus masters after priority information rotation (RHPRIF), such that the highest priority is given to master 1 (step S820).

Next, the request-reordering logic 620, the request-selecting logic 630, and the grant-reordering logic 640 operate according to the priority information following priority information rotation (RHPRIF information) (steps S830–850).

Here, if the request-reordering logic 620 receives request signals from the bus masters, the request-reordering logic 620 reorders requested priorities of the bus masters corresponding to the RHPRIF information where the highest priority is given to master 1 and outputs the request-reordering signal (step S830). The request-selecting logic 630 outputs the bus master-selecting signal according to priorities in response to the request-reordering signal such that the highest priority is given to master 1 (step S840). The grant-reordering logic 640 outputs the bus master grant signal according to priorities to the bus masters in response to the bus master-selecting signals such that the bus master grant signal is given to master 1 (step S850).

As described above, in the programmable fixed priority and round-robin arbiter according to the present invention, the request-selecting logic 630, the request-reordering logic 620, and the grant-reordering logic 640 can be shared by both the programmable fixed priority mode and the round-robin mode. In addition, additional multiplexers 220 and 250 are not required to select the request signal and the bus master grant signal according to an operation mode. Thus, power consumption can be reduced, and a decrease in system speed due to the additional multiplexers 220 and 250 of the conventional arbiter can be prevented.

In addition, since loads of the request signal input from the master blocks or loads of the bus master-selecting signal output from the request-selecting logic 130 are reduced, the processing speed can be enhanced.

The request signal output from the bus masters is a flip-flop (F/F) output signal and has input delay before it is input to the arbiter from the master block. Therefore, since it is possible to make the RHPRIF information by rotating the HPRIF information with the pointer information during the input delay of the request signal, the time required to generate the RHPRIF information by rotating the HPRIF information is not included in the overall operation delay of the arbiter, and thus the processing speed of the arbiter is not reduced as a result of the rotation. That is, when the RHPRIF information is generated by rotating the HPRIF information in response to the pointer information, decoding is performed by controlling predetermined multiplexers, and thus an additional clock period is not required.

FIG. 8 is a conceptual view that explains operations of a programmable fixed priority and round-robin arbiter according to the present invention in a round-robin mode in more detail.

Referring to FIG. 8, when the programmable fixed priority and the round-robin arbiter according to the present invention operates in the round-robin mode, the highest priority is assigned to each bus master according to periodic changes of the pointer information. That is, if the bus master grant signal is output to a bus master, the lowest priority is given to the bus master which previously had the highest priority. Here, the pointer information periodically changes. In particular, when the grant-reordering logic 640 outputs the bus master grant signal of the highest priority, the pointer information is increased by one so that a bus master which previously had the second to highest priority can now have the highest priority. For example, in FIG. 7, when the grant-reordering logic 640 outputs the bus master grant signal of the highest priority, the pointer information is increased from "1" to "2".

FIG. 9 is a conceptual view that explains operations of a programmable round-robin mode of the programmable fixed priority and round-robin arbiter according to the present invention.

Referring to FIG. 9, the programmable fixed priority and round-robin arbiter can program priority information on bus masters in a HPRIF register included in the HPRIF rotating logic 610 in the round-robin mode as well as in the fixed priority mode. As shown in FIG. 9, priority information stored in the fields HPRIF0, HPRIF1, HPRIF2, and HPRIF3 can be respectively programmed as master 2, master 1, master 3, and master 0 and can be programmed as other priority information.

Figure 10:
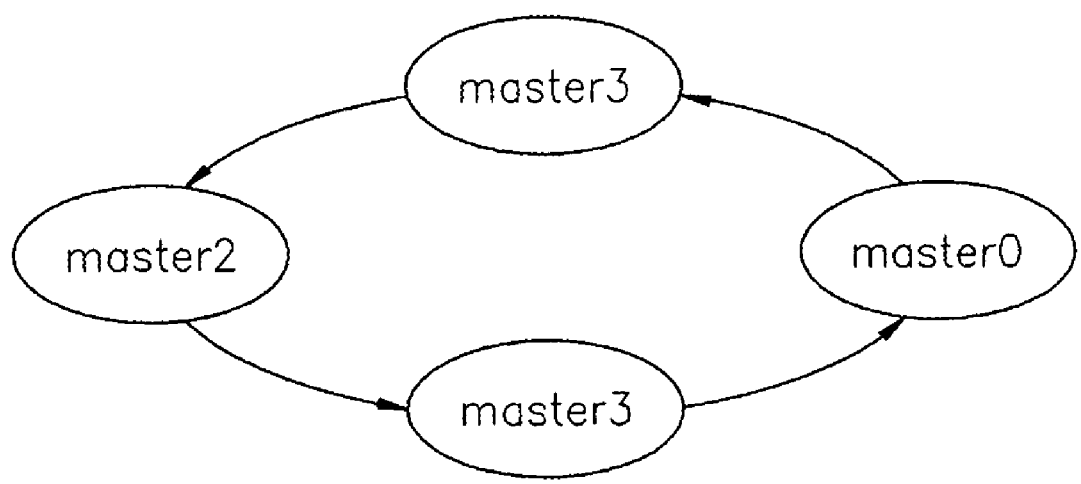
FIG. 10 is a conceptual view for explaining the operation of a program which assigns weight to a master in a round-robin mode of the programmable fixed priority and round-robin arbiter according to the present invention.

FIG. 10 is a conceptual view that explains a program which gives weight to a master in a round-robin mode of the programmable fixed priority and round-robin arbiter according to the present invention.

Referring to FIG. 10, it is possible to program the priority information to give weight to a certain master, such as master 3. Thus, contrary to the conventional arbiter which rotates the request order and the grant order only according to a predetermined order by hardware in the round-robin mode, the programmable fixed priority and the round-robin arbiter according to the present invention can maximize performance of bus arbitration according to methods of giving priority to masters by giving weight to a certain master for occupation of a bus not used in the round-robin mode.

As described above, in the arbiter operating in the programmable fixed mode and the round-robin mode, the HPRIF rotating logic 160 rotates the priority information on the bus masters stored in a register in a predetermined direction to give the highest priority to the bus master corresponding to the changeable pointer information and outputs the changed priority information. Here, if the request signal is received from the bus masters, the request-reordering logic 620 reorders the requested priorities of the bus masters to be in accordance with the changed priority information and outputs the request-reordering signal. Thus, the request-selecting logic 630 outputs the bus master-selecting signal according to priorities corresponding to the request-reordering signal, and the grant-reordering logic 640 outputs the bus master grant signal to the bus masters according to the priorities in response to the bus master-selecting signal.

The programmable fixed priority and the round-robin arbiter according to the present invention can support a fixed priority mode and a round-robin mode at the same time and can rotate HPRIF register information in which priority information on bus masters is stored. Thus, the two independent circuits required for the fixed priority mode and for the round-robin mode in the conventional arbiter are replaced by a single, common circuit in the case of the present invention. Therefore, a circuit of the programmable fixed priority and the round-robin arbiter according to the present invention is simpler than that of the conventional arbiter, and as a result, processing speed can be improved. In addition, since unnecessary circuit operations in the round-robin mode of the conventional arbiter are eliminated from the programmable fixed priority and the round-robin arbiter according to the present invention, power consumption can be reduced.

Further, when priority information, which is assigned to each bus master, is programmed, it is possible to give weight to a specific master for occupation opportunity of a bus not used. In particular, since the priority is rotated in the round-robin mode according to a program where weight is given to the specific master, performance of bus arbitration can be maximized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A programmable fixed priority and round-robin arbiter comprising:
   a rotating unit which, when operating in both a fixed priority mode and in a round-robin mode, rotates priority information related to bus masters stored in a register in a direction of rotation to give the highest priority to a bus master in response to pointer information which indicates the bus master currently having the highest priority, the pointer information defining the amount of rotation to be initiated by the rotating unit so that reordered priority information is available in the register, and outputs the reordered priority information;
   a single, common request-reordering unit used for operation in both the fixed priority mode and in the round-robin mode, which, when a request signal is received from the bus masters, reorders requested priorities of the bus masters to be in accordance with the reordered priority information and outputs a request-reordering signal;
   a request-selecting unit which outputs a bus master-selecting signal according to priorities in response to the request-reordering signal; and
   a single, common grant-reordering unit used for operation in both the fixed priority mode and in the round-robin mode, which outputs a bus master grant signal to the bus masters according to priorities in response to the bus master-selecting signal.

2. The programmable fixed priority and round-robin arbiter of claim 1, wherein, when operating in the round-robin mode, the priority information is programmed such that a higher weight in the form of increased access to a bus common to the bus masters is given to at least one of the bus masters.

3. The programmable fixed priority and round-robin arbiter of claim 1, wherein the pointer information does not change in the fixed priority mode and periodically changes in the round-robin mode.

4. The programmable fixed priority and round-robin arbiter of claim 3, wherein a period of the periodic change is a time period corresponding to when the bus master grant signal of the highest priority is output.

5. A bus control method in which an arbiter operating in a fixed priority mode and in a round-robin mode controls a plurality of bus masters, the bus control method comprising:
   the arbiter rotating priority information related to bus masters stored in a register to give the highest priority to a bus master in response to pointer information which indicates the bus master currently having the highest priority in both the fixed priority mode and the round-robin mode, the pointer information defining the amount of rotation to be initiated so that reordered priority information is available in the register, and outputting the reordered priority information;
   at least one of the bus masters transmitting a request signal for occupation of a bus to the arbiter;
   the arbiter reordering requested priorities of the bus masters corresponding to the reordered priority information operation and outputting a request-reordering signal at a single, common request-reordering unit used for operation in both the fixed priority mode and the round-robin mode;
   the arbiter outputting a bus master-selecting signal according to priorities in response to the request-reordering signal; and
   the arbiter outputting a bus master grant signal to the bus masters in response to the bus master-selecting signal according to priorities, the bus master grant signal being output from a single, common grant-reordering unit used for operation in both the fixed priority mode and the round-robin mode.

6. The bus control method of claim 5, wherein, when operating in the round-robin mode, the priority information is programmed such that higher weight in the form of increased access to a bus common to the bus masters is given to at least one of the bus masters.

7. The bus control method of claim 5, wherein the pointer information does not change in the fixed priority mode and periodically changes in the round-robin mode.

8. The bus control method of claim 7, wherein a period of the periodic change is the time period corresponding to when the bus master grant signal of the highest priority is output.

* * * * *